United States Patent
Kim et al.

(10) Patent No.: US 7,573,852 B2
(45) Date of Patent: Aug. 11, 2009

(54) TRANSMITTING/RECEIVING APPARATUS AND METHOD FOR PACKET RETRANSMISSION IN A MOBILE COMMUNICATION SYSTEM

(75) Inventors: Noh-Sun Kim, Taejon-Kwangyokshi (KR); Yong-Suk Moon, Songnam-shi (KR); Hun-Kee Kim, Seoul (KR); Jae-Seung Yoon, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1174 days.

(21) Appl. No.: 10/271,277

(22) Filed: Oct. 15, 2002

(65) Prior Publication Data

US 2003/0072286 A1   Apr. 17, 2003

(30) Foreign Application Priority Data

Oct. 15, 2001 (KR) .................... 10-2001-0063519

(51) Int. Cl.
*H04B 7/216* (2006.01)
*H04J 11/00* (2006.01)

(52) U.S. Cl. .................. 370/335; 370/203; 370/342

(58) Field of Classification Search ................ 370/349, 370/465, 338, 335, 342, 203; 375/279, 281; 455/422.1, 550.1, 450, 422
See application file for complete search history.

(56) References Cited

U.S. PATENT DOCUMENTS

| | | | | |
|---|---|---|---|---|
| 6,126,310 | A * | 10/2000 | Osthoff et al. | 714/751 |
| 6,247,150 | B1 | 6/2001 | Niemela | |
| 6,738,370 | B2 * | 5/2004 | Ostman | 370/349 |
| 6,769,085 | B2 * | 7/2004 | Von Elbwart et al. | 714/748 |
| 7,227,904 | B2 * | 6/2007 | Von Elbwart et al. | 375/261 |
| 7,362,733 | B2 * | 4/2008 | Kim et al. | 370/335 |
| 2002/0095635 | A1 * | 7/2002 | Wager et al. | 714/746 |
| 2003/0081576 | A1 * | 5/2003 | Kim et al. | 370/335 |

FOREIGN PATENT DOCUMENTS

| | | |
|---|---|---|
| CA | 2 457 230 | 3/2003 |
| DE | 10124417 | 5/2001 |
| DE | 60102296 | 7/2004 |

(Continued)

OTHER PUBLICATIONS

Combined Search and Examination Report dated Feb. 27, 2003, issued in a counterpart application, namely Appln. No. GB0223885.5.

(Continued)

*Primary Examiner*—Tilahun Gesesse
(74) *Attorney, Agent, or Firm*—The Farrell Law Firm, LLP

(57) ABSTRACT

A transmitting/receiving apparatus and method for packet retransmission in a mobile communication system. Upon request for a retransmission from a receiver, a transmitter inverts initially transmitted coded bits if the retransmission is odd-numbered for the same data, modulates the inverted bits, and transmits the modulated bits to the receiver. Then the receiver recovers the coded bits by demodulation. If the coded bits are retransmitted an odd number of times, the receiver decodes the coded bits after inversion. Thus the error probabilities of initial transmission bits and retransmission bits are averaged in effect and decoding performance is improved.

15 Claims, 11 Drawing Sheets

FOREIGN PATENT DOCUMENTS

| | | |
|---|---|---|
| EP | 1265413 | 12/2002 |
| JP | 58-136151 | 8/1983 |
| JP | 64-055942 | 3/1989 |
| JP | 02-312338 | 12/1990 |
| JP | 06-006399 | 1/1994 |
| JP | 07-038448 | 2/1995 |
| JP | 11-146027 | 5/1999 |
| JP | 2000-188609 | 7/2000 |
| JP | 2000-201132 | 7/2000 |
| JP | 2001-077789 | 3/2001 |
| JP | 2002-199037 | 7/2002 |
| JP | 2005-501464 | 1/2005 |
| WO | WO 02/067491 | 8/2002 |
| WO | WO 03/019794 | 3/2003 |

OTHER PUBLICATIONS

2002 IEEE 56$^{th}$ Vehicular Technology Conference Proceedings, Sep. 24-28, 2002, Ch. Wengerter et al., "Advanced Hybrid ARQ Technique Employing a Signal Constellation Rearrangement."

Electronics Letters, vol. 34, No. 18, Sep. 3, 1998, M.P. Schmitt, "Hybrid ARQ Scheme Employing TCM and Packet Combining."

British Examination Report dated Nov. 14, 2003 issued in a counterpart application, namely, Appln. No. GB0223885.5.

TSG-RAN Working Group I, Meeting #19, Las Vegas, USA, Feb. 27-Mar. 2, 2001, "Enhanced HARQ Method With Signal Constellation Rearrangement".

Schmitt, "Improved Retransmission Strategy for Hybrid ARQ Schemes Employing TCM", 1999 IEEE, pp. 1226-1228.

Otnes et al., Adaptive Data Rate Using ARQ and Nonuniform Constellations, 2001 IEEE.

\* cited by examiner

| BIT 1 | BIT 2 | BIT 3 | BIT 4 | BIT 5 | BIT 6 | BIT 7 | BIT 8 | BIT 9 | BIT 10 | BIT 11 | BIT 12 |
|---|---|---|---|---|---|---|---|---|---|---|---|
| 0 | 0 | 0 | 0 | 1 | 1 | 0 | 0 | 0 | 1 | 1 | 1 |
| SYMBOL 1 | | | | SYMBOL 2 | | | | SYMBOL 3 | | | |
| 1 | 1 | 1 | 1 | 0 | 0 | 1 | 1 | 1 | 0 | 0 | 0 |

BIT INVERSION

FIG.9

TRANSMITTING/RECEIVING APPARATUS AND METHOD FOR PACKET RETRANSMISSION IN A MOBILE COMMUNICATION SYSTEM

PRIORITY

This application claims priority to an application entitled "Transmitting/Receiving Apparatus and Method for Packet Retransmission in a Mobile Communication System" filed in the Korean Industrial Property Office on Oct. 15, 2001 and assigned Serial No. 2001-63519, the contents of which are hereby incorporated by reference.

BACKGROUND OF THE INVENTION

1. Field of the Invention

The present invention relates generally to a W-CDMA (Wide-band Code Division Multiple Access) mobile communication system, and in particular, to a transmitting/receiving apparatus and method for increasing decoding performance at retransmission.

2. Description of the Related Art

Adverse influences on high-speed, high-quality data service are attributed to a channel environment in a mobile communication system. The radio channel environment varies frequently because of signal power changes caused by white noise and fading, shadowing, the Doppler effect that occurs due to the movement and frequent velocity change of a terminal, and interference from other users and multi-path signals. Therefore, aside from conventional technologies in the second or third generation mobile communication system, an advanced technique is required to support wireless high-speed data packet service. In this context, the 3GPP ($3^{rd}$ Generation Partnership Project) and the 3GPP2 commonly address the techniques of AMCS (Adaptive Modulation & Coding Scheme) and H-ARQ (Hybrid Automatic Repeat Request).

The AMCS adjusts a modulation order and a code rate according to changes in a downlink channel condition. The downlink channel quality is usually obtained by measuring an SNR (Signal-to-Noise Ratio) of a received signal at a UE (User Equipment). The UE transmits the channel quality information to a BS (Base Station) on an uplink. Then the BS estimates the downlink channel condition based on the channel quality information and determines an appropriate modulation scheme and code rate for a channel encoder according to the estimated downlink channel condition.

Implementation of H-ARQ is challenging because there are many considerations in terms of system complexity including reception buffer size and signaling as well as channel quality.

QPSK (Quadrature Phase Shift Keying), 8PSK (8-ary PSK), and 16QAM (16-ary Quadrature Amplitude Modulation) and code rates of 1/2 and 1/4 are used in the existing high-speed wireless data packet communication system. In AMCS, a BS applies a high-order modulation (e.g., 16QAM and 64QAM) and a high code rate of 3/4 to a UE having good channel quality such as its adjacent UEs, and a low-order modulation (e.g., 8PSK and QPSK) and a low code rate of 1/2 to a UE having bad channel quality such as a UE at a cell boundary. The AMCS significantly reduces interference signals and improves system performance, as compared to the conventional method relying on high-speed power control.

The H-ARQ is a retransmission control technique used to compensate for errors in initially transmitted data packets. The H-ARQ is divided into chase combining (CC), full incremental redundancy (FIR), and partial incremental redundancy (PIR).

The CC is retransmission of the same packet as used at initial transmission. A receiver combines the retransmission packet with the initial transmission packet stored in a reception buffer, thereby increasing the reliability of coded bits input to a decoder and thus obtaining the performance gain of the overall mobile communication system. About a 3-dB performance gain is affected on the average since combining the same two packets is equivalent to repeated coding of the packet.

The FIR is retransmission of a packet having only parity bits. A decoder decodes data using the new parity bits as well as initially transmitted systematic bits. As a result, decoding performance is increased. It is well known in coding theory that a higher performance gain is obtained at a low code rate than by repeated coding. Therefore, the FIR is superior to the CC in terms of performance gain.

The PIR is retransmission of a packet that is a combination of systematic bits and new parity bits. A receiver combines the retransmitted systematic bits with initially transmitted systematic bits during decoding. Thus, the PIR is similar to the CC in effect. The PIR is also similar to the FIR in that the new parity bits are used at decoding. Since a relatively high code rate is used in the PIR than in the FIR, the PIR is in the middle of the FIR and the CC in terms of performance.

Consequently, use of the independent techniques of AMCS and H-ARQ can improve system performance significantly.

FIG. 1 is a block diagram of a transmitter in a typical high-speed wireless data packet communication system. Referring to FIG. 1, the transmitter includes a channel encoder 110, a rate controller 120, an interleaver 130, a modulator 140, and a controller 150. Upon input of information bits in transport blocks of size N, the channel encoder 110 encodes the information bits at a predetermined code rate (e.g., 1/2 or 3/4). The channel encoder 110 can support a plurality of code rates using a mother code rate of 1/6 or 1/5 through symbol puncturing or symbol repetition. The controller 150 controls the code rate.

The rate controller 120 matches the data rate of the coded bits generally by transport channel-multiplexing, or by repetition and puncturing if the number of the coded bits is different from that of bits transmitted in the air. To minimize data loss caused by burst errors, the interleaver 130 interleaves the rate-matched bits. The modulator 140 modulates the interleaved bits in a modulation scheme determined by the controller 150.

The controller 150 controls the code rate of the channel encoder 110 and the modulation scheme of the modulator 140 according to the radio downlink channel condition. To selectively use QPSK, 8PSK, 16QAM, and 64QAM according to a radio environment, the controller 150 supports AMCS. Though not shown, a UE spreads the modulated data with a plurality of Walsh codes to identify data transport channels and with a PN code to identify a BS.

FIG. 2 illustrates a signal constellation when using 16QAM in the modulator 140. Referring to FIG. 2, 4 coded bits form a single modulation symbol, which is mapped to one of 16 signal points. The 16 modulation symbols are categorized into region 1 having the highest error probability, region 2 with an intermediate error probability, and region 3 with the lowest error probability according to how easily a receiver can identify corresponding modulation symbols.

FIG. 3 is a graph illustrating error probabilities of the regions in a simulation under an AWGN (Additive White Gaussian Noise) environment. For example, modulation symbols 6, 7, 10, and 11 in region 1 have a relatively high error probability.

Modulation symbols in a high-order modulation scheme such as 16QAM or 64QAM can be grouped into regions having different error probabilities. In this case, retransmission bits have the same error probability as initial transmission bits in conventional H-ARQ. Consequently, error probability is identical in initial transmission and retransmission.

It is known in the art that decoding performance is improved when an LLR (Log Likelihood Ratio) of input bits is uniform. Yet transmission of particular bits with a high error probability deteriorates the decoding performance. Thus there is a need for a novel retransmission technique that increases performance at retransmission.

SUMMARY OF THE INVENTION

It is, therefore, an object of the present invention to provide a transmitting/receiving apparatus and method in which packet retransmission is carried out with an increased system performance in a wireless communication system.

It is another object of the present invention to provide a transmitting/receiving apparatus and method that increase a reliability of packet retransmission in a wireless communication system.

It is also another object of the present invention to provide a transmitting/receiving apparatus and method for enabling a receiver to receive bits with a higher reception probability in a wireless communication system.

It is a further object of the present invention to provide a transmitting/receiving apparatus and method for more efficient packet retransmission in a wireless communication system supporting H-ARQ.

It is also a further object of the present invention to provide a transmitting/receiving apparatus and method in which retransmission bits are changed from initial transmission bits to have a different error probability.

It is still another object of the present invention to provide a receiving apparatus for receiving retransmission bits altered from initial transmission bits to have a different error probability.

It is also still another object of the present invention to provide a transmitting apparatus and method for inverting bits at a retransmission.

It is yet another object of the present invention to provide a receiving apparatus and method for recovering inverted retransmission bits.

To achieve the above and other objects, upon request for a retransmission from a receiver, a channel encoder encodes input data at a predetermined code rate and outputs coded bits in a transmitter. An interleaver interleaves the coded bits in a predetermined interleaving rule and a bit inverter inverts the interleaved bits if the retransmission request is odd-numbered for the same data. Then a modulator modulates the inverted bits in a predetermined modulation scheme.

In the receiver, a demodulator demodulates data received by a retransmission request according to a predetermined modulation scheme and outputs coded bits. A bit inverter determines whether the coded bits have been received by an odd-numbered retransmission request for the same data, and inverts the coded bits if the data has been received by an odd-numbered retransmission request. A deinterleaver deinterleaves the inverted bits in a predetermined deinterleaving rule. A combiner combines the deinterleaved bits with previously coded bits and a channel decoder decodes the combined bits and outputs decoded information bits. An error checker extracts error check bits from the decoded information bits on a packet basis and determines whether the information bits have errors according to the extracted error check bits. If the information bits have errors, a controller requests a retransmission of the coded bits to the transmitter.

BRIEF DESCRIPTION OF THE DRAWINGS

The above and other objects, features, and advantages of the present invention will become more apparent from the following detailed description when taken in conjunction with the accompanying drawings in which:

FIG. 9 illustrates bit inversion in the transmitter according to the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

H-ARQ, to which the present invention is applied, is a link controlling technique for correcting packet errors by retransmission. As is evident from its name, retransmission is one more transmission of initially transmitted but failed packet data. Therefore, new data is not transmitted at a retransmission.

As described before, H-ARQ is divided into H-ARQ type II and H-ARQ type III depending on whether systematic bits are retransmitted or not. The major H-ARQ type II is FIR and H-ARQ type III includes CC and PIR, which are discriminated according to whether the same parity bits are retransmitted.

The present invention as described below is applied to all the above H-ARQ methods. In the CC, a retransmission packet has the same bits as an initial transmission packet, and in the FIR and PIR a retransmission packet and an initial transmission packet have different bits. Since the present invention pertains to a method of increasing the transmission efficiency of a retransmission packet, it is obviously applicable when an initial transmission packet is different from its retransmission packet. Yet, the following description is made in the context of the CC by way of example.

Transmission

Figure 4:
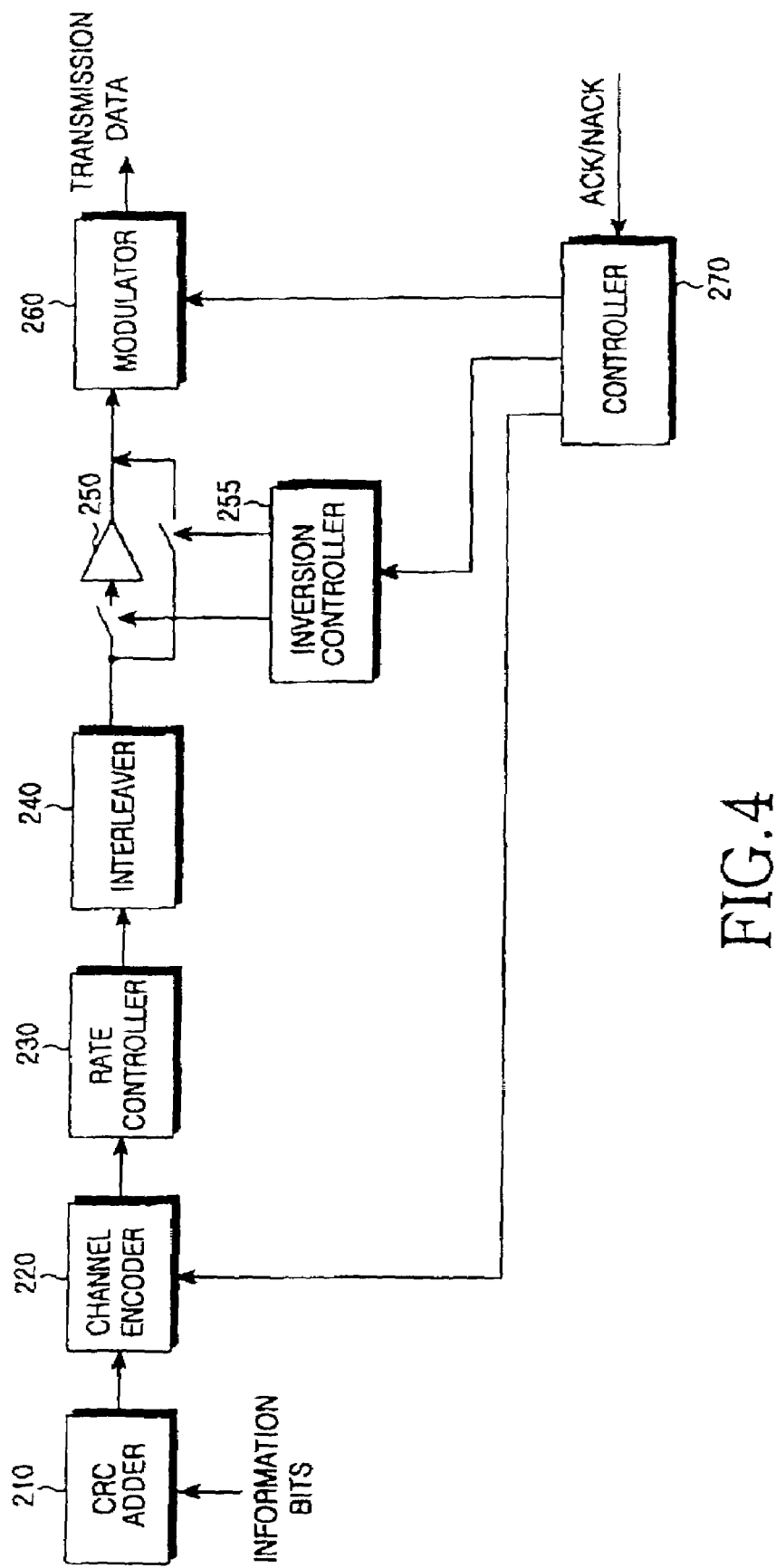
FIG. 4 is a block diagram of a transmitter in a CDMA mobile communication system according to an embodiment of the present invention.

FIG. 4 is a block diagram of a transmitter in a CDMA mobile communication system according to an embodiment of the present invention. Referring to FIG. 4, the transmitter includes a CRC (Cyclic Redundancy Check) adder 210, a channel encoder 220, a rate controller 230, an interleaver 240, a bit inverter 250, an inversion controller 255, a modulator 260, and a controller 270. In the embodiment of the present invention, coded bits are inverted to be mapped to regions with different error probabilities from those at an initial transmission at a retransmission.

The CRC adder 210 adds CRC bits to input information bits for an error check on a packet data basis. The channel encoder 220 encodes the packet data with the CRC bits at a predetermined code rate by predetermined coding. The packet data is coded to systematic bits and parity bits that are error control bits for the systematic bits. Turbo coding or convolutional coding can be used.

The code rate determines the ratio of the parity bits to the systematic bits. With a code rate of 1/2, for example, the channel encoder 220 outputs one systematic bit and one parity bit for the input of one information bit. With a code rate of 3/4, the channel encoder 220 outputs three systematic bits and one parity bit for the input of three information bits. In the embodiment of the present invention, other code rates can also be applied aside from 1/2 and 3/4.

The rate controller 230 matches the data rate of the coded bits by repetition and puncturing. The interleaver 240 randomly permutes the sequence of the rate-matched bits. The interleaved symbols are stored in a buffer (not shown) for retransmission. Upon request of retransmission from a receiver, the buffered packets are wholly or partially output under the control of the controller 270.

The bit inverter 250 inverts the bits of a retransmission packet under the control of the inversion controller 255. The inversion controller 255 activates the bit inverter 250 only at an odd-numbered retransmission of a packet. If the bit inverter 250 is operated at each retransmission, the same packet is transmitted at each retransmission. If a retransmission is requested after inverted bits are delivered at a first retransmission, the original bits are transmitted without bit inversion at a second retransmission.

More specifically, when bit inversion is not needed, such as at an initial transmission or at an even-numbered retransmission, the inversion controller 255 turns off a switch at a frontal end of the bit inverter 250 and turns on a bypass switch, so that received bits bypass the bit inverter 250. On the other hand, if bit inversion is needed, the inversion controller 255 turns on the switch at the frontal end of the bit inverter 255 and turns off the bypass switch, so that received bits are inverted. Thus, at a retransmission, the bit inverter 250 makes coded bits to be mapped to regions with different error probabilities from those at an initial transmission.

While the bit inverter 250 is disposed between the interleaver 240 and the modulator 260 in FIG. 4, it can be located at other places in the transmitter as long as it is before the modulator 260. For example, the bit inverter 250 can be at the frontal end of the interleaver 240.

The modulator 260 modulates input coded bits in a predetermined modulation scheme.

The controller 270 provides overall control to the components of the transmitter. The controller 270 first determines a code rate of the channel encoder 220 and a modulation scheme of the modulator 260 according to a current radio channel condition. The controller 270 also processes a retransmission request from an upper layer and feeds the retransmission request information to the inversion controller 255. The retransmission request information indicates whether the receiver has requested a packet retransmission and how many times retransmission has been carried out.

It can be contemplated that the inversion controller 255 is integrated into the controller 270. In this case, the integrated controller determines the code rate and modulation scheme and whether the bit inverter 150 is to be activated according to signaling from the upper layer.

Figure 5:
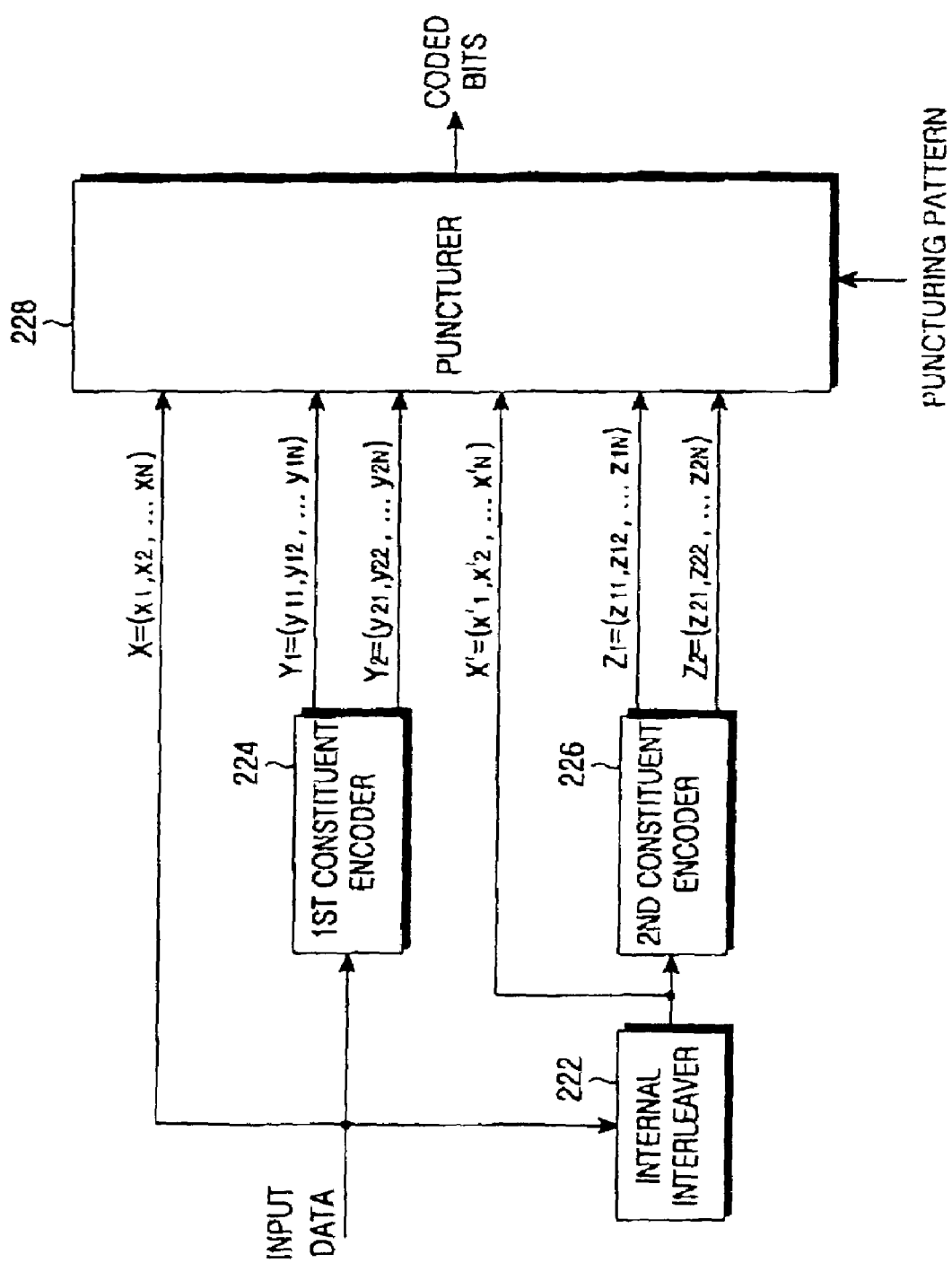
FIG. 5 is a detailed block diagram of a channel encoder illustrated in FIG. 4.

FIG. 5 is a detailed block diagram of the channel encoder 220 illustrated in FIG. 4. It is assumed that the channel encoder 220 uses a mother code rate of 1/6 provided from the 3GPP ($3^{rd}$ Generation Partnership Project) standards.

Referring to FIG. 5, the channel encoder 220 outputs one data frame of size N as a systematic bit frame X ($=x_1, x_2, \ldots, x_N$). Here, N is determined according to the code rate. A first constituent encoder 224 outputs two different parity bit frames Y1 ($=y_{11}, y_{12}, \ldots, y_{1N}$) and Y2 ($=y_{21}, y_{22}, \ldots, y_{2N}$) for the input of the data frame.

An internal interleaver 222 interleaves the data frame and outputs it as an interleaved systematic bit frame X' ($=x'_1, x'_2, \ldots x'_N$). A second constituent encoder 226 encodes the interleaved systematic bit frame X' to two different parity bit frames Z1 ($=z_{11}, z_{12}, \ldots, z_{1N}$) and Z2 ($=z_{21}, z_{22}, \ldots, z_{2N}$).

A puncturer 228 generates intended systematic bits S and parity bits P by puncturing the systematic bit frame X, the interleaved systematic bit frame X', and the parity bit frames Y1, Y2, Z1, and Z2 in a puncturing pattern received from the controller 270.

The puncturing pattern is determined according to the code rate of the channel encoder 220 and the H-ARQ method used. For example, when the code rate is 1/2, puncturing patterns available in H-ARQ type III (CC and PIR) are as follows.

$$P_1 = \begin{bmatrix} 1 & 1 \\ 1 & 0 \\ 0 & 0 \\ 0 & 0 \\ 0 & 0 \\ 0 & 1 \end{bmatrix} \quad (1)$$

$$P_2 = \begin{bmatrix} 1 & 1 \\ 1 & 0 \\ 0 & 0 \\ 0 & 0 \\ 0 & 1 \\ 0 & 0 \end{bmatrix} \quad (2)$$

where 1 indicates a transmission bit and 0 indicates a punctured bit. Input bits are punctured from the left column to the right column.

One of the above puncturing patterns is used at an initial transmission and retransmissions in the CC, while they are alternately used at each transmission in the PIR.

In H-ARQ type II (FIR), systematic bits are punctured at retransmission. In this case, a puncturing pattern is "010010", for example.

In the CC, if the puncturing pattern $P_1$ (i.e., "110000" and "100001") is used, the puncturer 228 outputs bits X, Y1, X, and Z2 with the other bits punctured at each transmission. If the puncturing pattern $P_2$ (i.e., "110000" and "100010") is used, the puncturer 228 outputs bits X, Y1, X, and Z1 with the other bits punctured at each transmission.

In the PIR, the puncturer 228 outputs bits X, Y1, X, and Z2 at an initial transmission and bits X, Y1, X, and Z1 at a retransmission.

Figure 6:
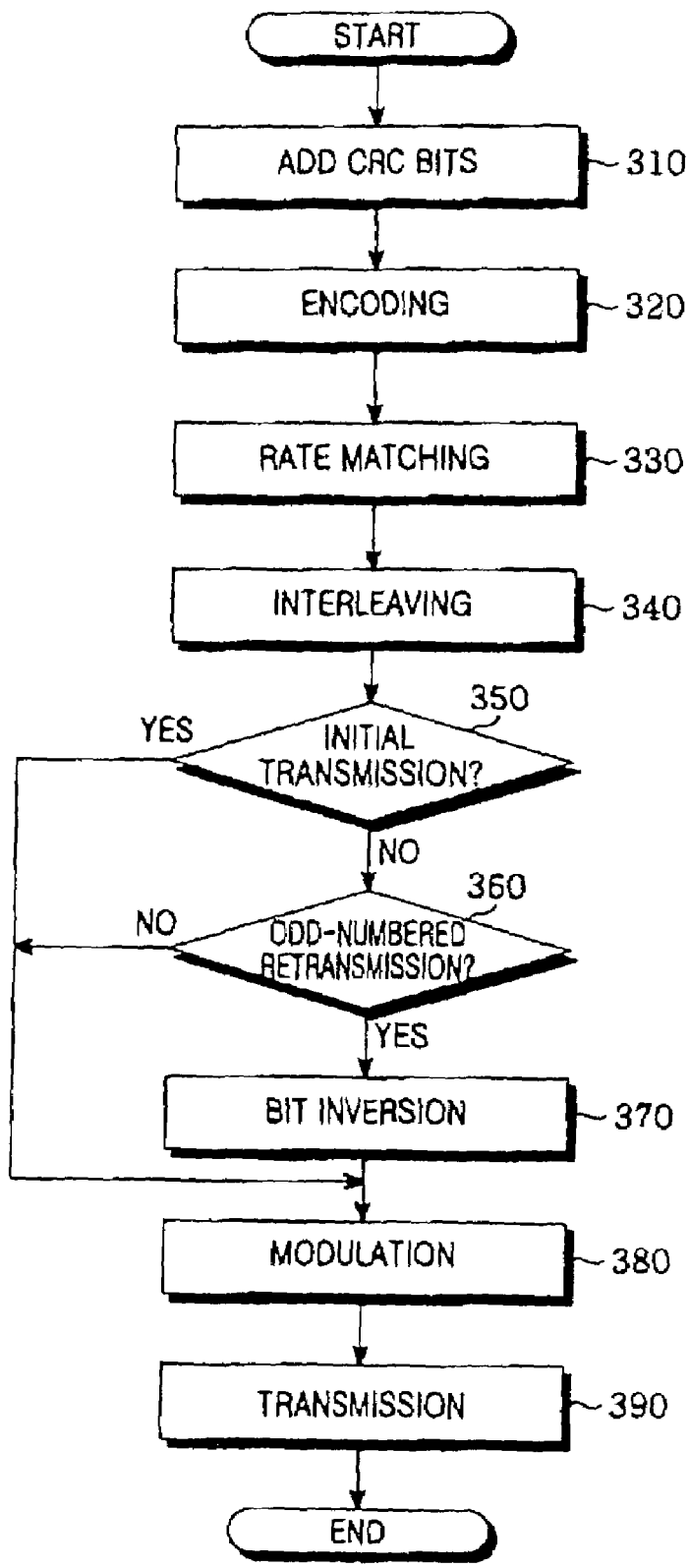
FIG. 6 is a flowchart illustrating the operation of the transmitter in the CDMA mobile communication system according to the embodiment of the present invention.

FIG. 6 is a flowchart illustrating an operation of the transmitter according to the embodiment of the present invention. Referring to FIG. 6, the CRC adder 210 adds CRC bits to input data on a packet basis in step 310 and the channel encoder 220 encodes the packet data with the CRC bits in step 320. In step 330, the rate controller 230 matches the rate of the coded bits by repetition and puncturing. The interleaver 240 interleaves the rate-matched bits in step 340.

The inversion controller 255 determines whether the packet is to be initially transmitted or retransmitted according to a retransmission request received from the controller 270 in step 350. For an initial transmission, the inversion controller 255 controls the interleaved bits to bypass the bit inverter 250 and feeds them to the modulator 260. Then the modulator 260 modulates the interleaved bits in step 380 and the modulated bits are transmitted in step 390.

On the other hand, for a retransmission, the inversion controller 255 determines the sequence number of the retransmission in step 360. If the retransmission is even-numbered, the inversion controller 255 controls the interleaved bits to bypass the bit inverter 250 and feeds them to the modulator 260. Then the modulator 260 modulates the interleaved bits in step 380 and the modulated bits are transmitted in step 390. If the retransmission is odd-numbered, the inversion controller 255 feeds the interleaved bits to the bit inverter 250. Then the bit inverter 250 inverts the interleaved bits in step 370 and the modulator 260 modulates the interleaved bits in the units of a modulation symbol in step 380 and the modulated bits are transmitted in step 390.

By modulating in the modulator 260, the inverted bits are mapped to different regions from the non-inverted bits. The different signal points have different error probabilities from those of the signal points to which the non-inverted bits are mapped. If initial transmission coded bits are "0000" referring to FIG. 2, they are mapped to a signal point 7 in region 1. At a retransmission, the bits are inverted to "1111", which are mapped to a signal point 13 in region 3. The change of error probability at the retransmission results in averaging the error probabilities of packets combined at a receiver and thus increases decoding performance.

Reception

Figure 7:
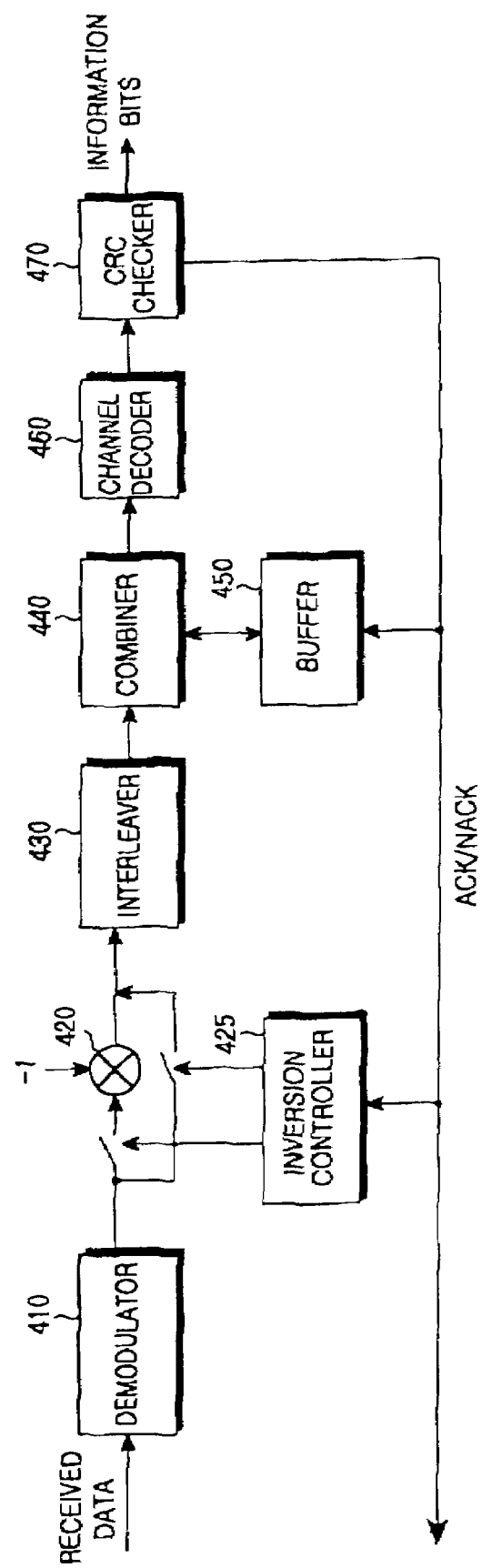
FIG. 7 is a block diagram of a receiver in the CDMA mobile communication system according to the embodiment of the present invention.

FIG. 7 is a block diagram of a receiver that is the counterpart of the transmitter illustrated in FIG. 4 according to the embodiment of the present invention. Referring to FIG. 7, the receiver includes a demodulator 410, a bit inverter 420, an inversion controller 425, a deinterleaver 430, a combiner 440, a buffer 450, a channel decoder 460, and a CRC checker 470.

In operation, the demodulator 460 demodulates data received from the transmitter in a demodulation method corresponding to the modulation scheme used in the modulator 260. The bit inverter 420 is a multiplier. The multiplier inverts the sign of an information bit, that is, converts 1 to −1 and −1 to 1, respectively. The bit inverter 420 performs bit inversion at each odd-numbered retransmission of the same packet under the control of the inversion controller 425. Thus the bit inverter 420 corresponds to the bit inverter 250 illustrated in FIG. 4.

While the transmitter uses the bit inverter 250 because coded bits output from the channel encoder 220 have hard values 0 and 1, the receiver uses the multiplier 420 for selectively multiplying each input bit by −1 under the control of the inversion controller 425 because demodulated bits output from the demodulator 410 have soft values −1 and 1. If the demodulator 410 outputs hard values, the multiplier 420 is replaced with a bit inverter.

The deinterleaver 430 deinterleaves coded bits received from the bit inverter 420 or from the demodulator 410 in a deinterleaving method corresponding to the interleaving in the interleaver 240 of the transmitter. While the multiplier 420 is disposed at the frontal end of the deinterleaver 430 in FIG. 7, it can be at the rear end of the deinterleaver 430 irrespective of the structure of the transmitter.

The combiner 440 combines the current received coded bits of a packet with the coded bits of the same packet accumulated in the buffer 450. If there are no coded bits of the same packet in the buffer 450, that is, at an initial transmission, the combiner 440 simply outputs the current received coded bits and stores them in the buffer 450 contemporaneously. The channel decoder 460 recovers the coded bits received from the combiner 440 by decoding them in a predetermined decoding method, turbo decoding herein corresponding to the coding method in the channel encoder 220 of the transmitter. By turbo decoding, the channel decoder 460 recovers systematic bits for the input of the systematic bits and parity bits.

The CRC checker 470 extracts CRC bits from the decoded information bits on a packet basis and determines whether the packet has errors using the extracted CRC bits. The error check result is delivered to a reception controller (not shown) in an upper layer. The reception controller processes the packet if the packet has no errors and transmits an ACK (Acknowledgement) signal to the transmitter. On the contrary, if the packet has errors, the reception controller transmits an NACK (Non-Acknowledgement) signal to the transmitter, requesting a retransmission of the packet.

If the ACK signal is transmitted to the transmitter, the buffer 450 is initialized with the coded bits of the corresponding packet deleted. If the NACK signal is transmitted to the transmitter, the coded bits of the packet remain in the buffer 450. The inversion controller 425 counts transmissions of the NACK signal to determine the sequence number of the next retransmission and control the inverter 420 correspondingly.

Figure 8:
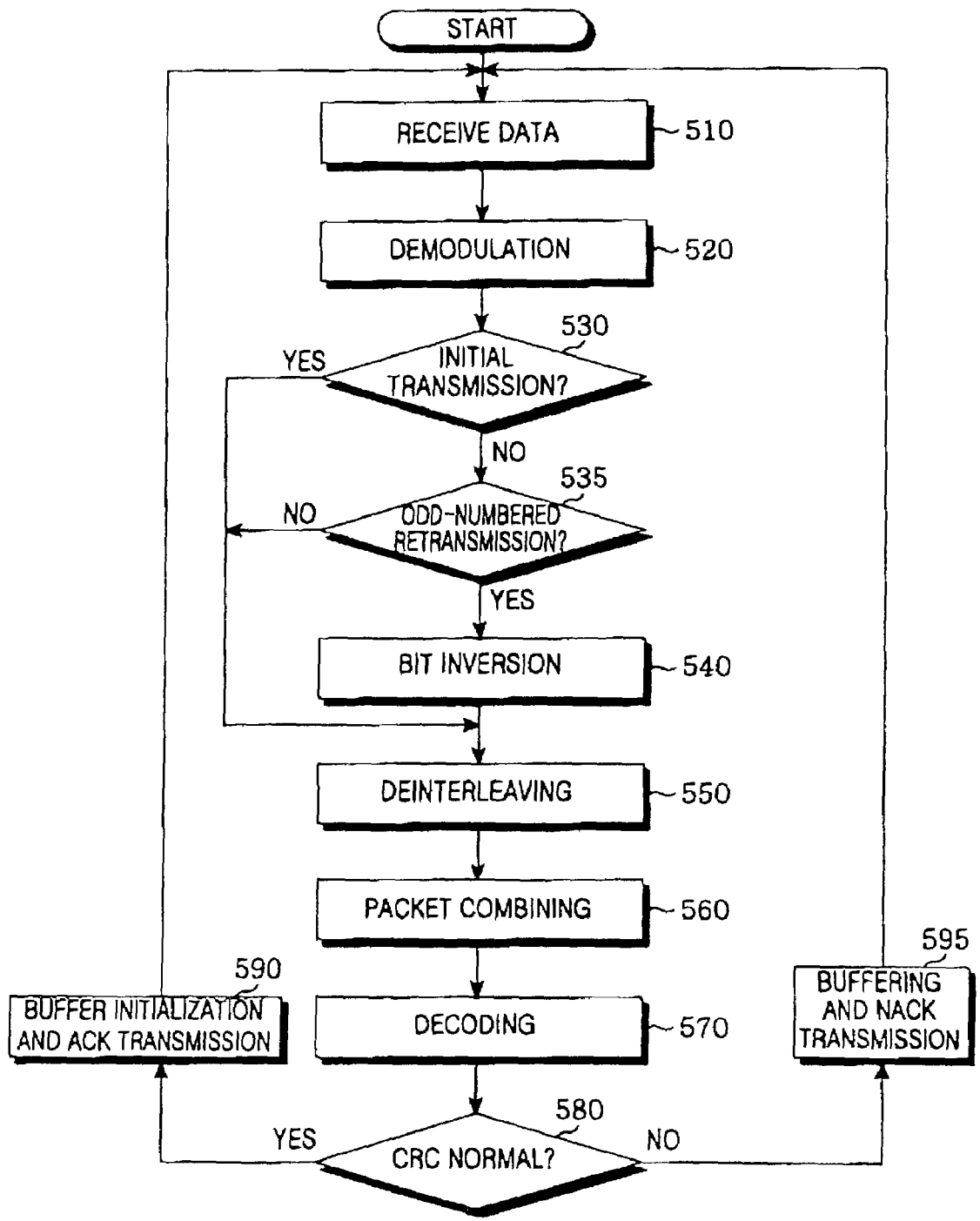
FIG. 8 is a flowchart illustrating an operation of the receiver in the CDMA mobile communication system according to the embodiment of the present invention.

FIG. 8 is a flowchart illustrating an operation of the receiver according to the embodiment of the present invention. Referring to FIG. 8, upon receipt of data on a radio transport channel in step 510, the demodulator 410 recovers coded bits by demodulating the received data on a modulation symbol basis according to a modulation scheme preset between the receiver and the transmitter in step 520. In step 530, the inversion controller 425 determines whether the coded bits are an initial transmission packet or a retransmission packet according to the count of NACK occurrences for the packet.

For retransmission, the inversion controller 425 determines the sequence number of the retransmission in step 535. If the retransmission is odd-numbered, the inversion controller 425 feeds the coded bits to the inverter 420. The bit inverter 420 inverts the coded bits in step 540. On the other hand, for an initial transmission in step 530 or an even-numbered retransmission in step 535, the inversion controller 425 makes the coded bits bypass the bit inverter 420.

The deinterleaver 430 deinterleaves the coded bits or inverted bits in step 550 and the combiner 440 combines the interleaved bits with the coded bits of the same packet accumulated in the buffer 450 in step 560. In step 570, the channel decoder 460 decodes the combined bits in a decoding method preset between the receiver and the transmitter and outputs the original information bits.

The CRC checker 470 extracts CRC bits from the decoded information bits on a packet basis and reports a CRC check result to the upper layer in step 580. If the packet has no errors, the buffer 450 is initialized and an ACK signal is transmitted to the transmitter in step 590. Then the packet is processed in the upper layer. On the contrary, if the packet has errors, the coded bits stored in the buffer 450 are preserved and an NACK signal requesting a retransmission of the packet is transmitted to the transmitter in step 595.

The entire transmission and reception according to the embodiment of the present invention will be described below with 16QAM used as a modulation scheme.

In operation, the CRC adder 210 adds CRC bits to intended data on a packet basis in the transmitter illustrated in FIG. 4. The channel encoder 220 encodes the data received from the CRC adder 210 at a code rate predetermined between the transmitter and the receiver.

The operation of the channel encoder 220 will be described in more detail referring to FIG. 5. The data including the CRC bits is output as a systematic bit frame X, and fed to the first constituent encoder 224 at the same time. The first constituent encoder 224 encodes the data to different parity bit frames Y1 and Y2.

The internal interleaver 222 interleaves the data and outputs the interleaved data as another systematic bit frame X'. The second constituent encoder 226 encodes the systematic bit frame X' to two different parity bit frames Z1 and Z2.

The puncturer 228 outputs coded bits containing systematic bits and parity bits by puncturing the systematic bit frames X and X' and the parity bit frames Y1, Y2, Z1 and Z2 at a desired code rate in a predetermined puncturing pattern. As described before, if the CC is adopted as the H-ARQ method, the same puncturing pattern is used at initial transmission and retransmission, which implies that the same bits are transmitted at initial transmission and retransmission. The puncturing pattern is stored in the puncturer 228 or provided externally. The latter case is applied in FIG. 5.

The rate controller 230 matches the rate of the coded bits received from the channel encoder 220. The interleaver 240 interleaves the rate-matched bits in an interleaving rule preset between the transmitter and the receiver. The bit inverter 250 inverts the interleaved bits under the control of the inversion controller 255. Bit inversion will be described in more detail with reference to FIG. 9.

FIG. 9 illustrates a 12-bit frame with a modulation order of 16. Here, one modulation symbol has 4 bits. Referring to FIG. 9, the first, second, and third modulation symbols are [0000], [1100], and [0111], respectively. When a NACK signal is received and thus a retransmission is requested, the original bits are inverted. Thus, [0000], [1100], and [0111] are converted [1111], [0011], and [1000], respectively.

Figure 1:
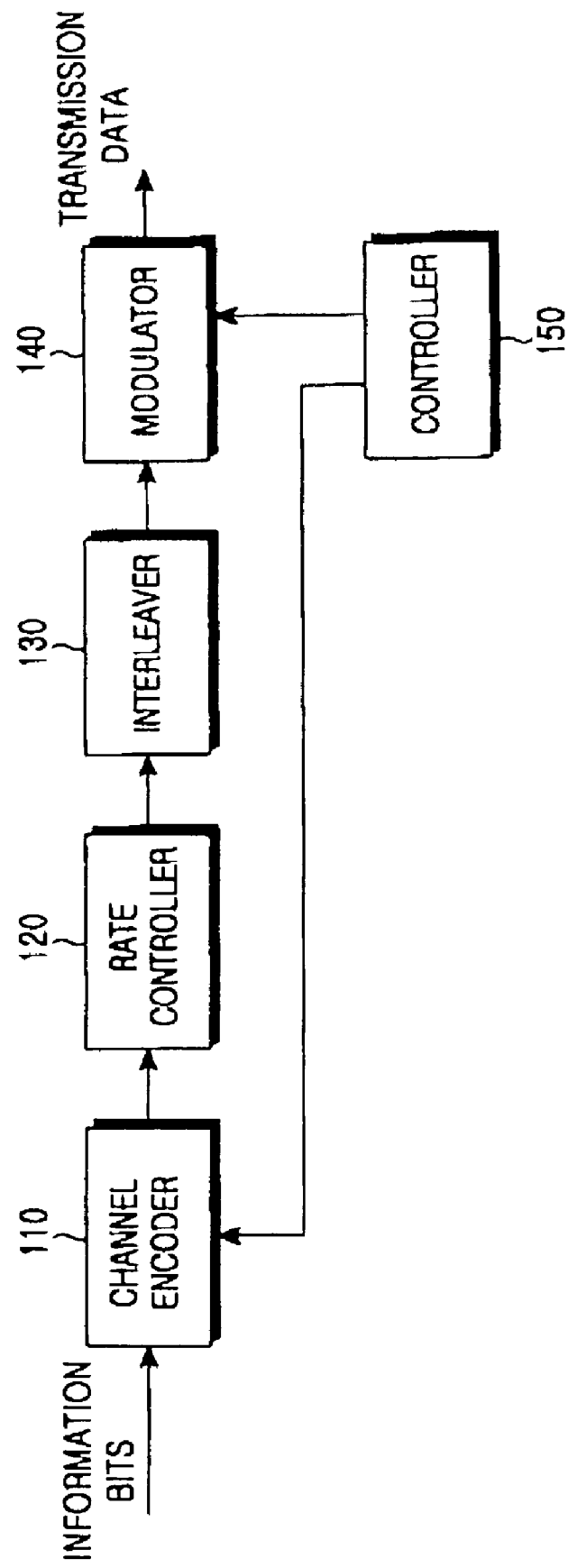
FIG. 1 is a block diagram of a transmitter in a typical CDMA mobile communication system.
Figure 2:
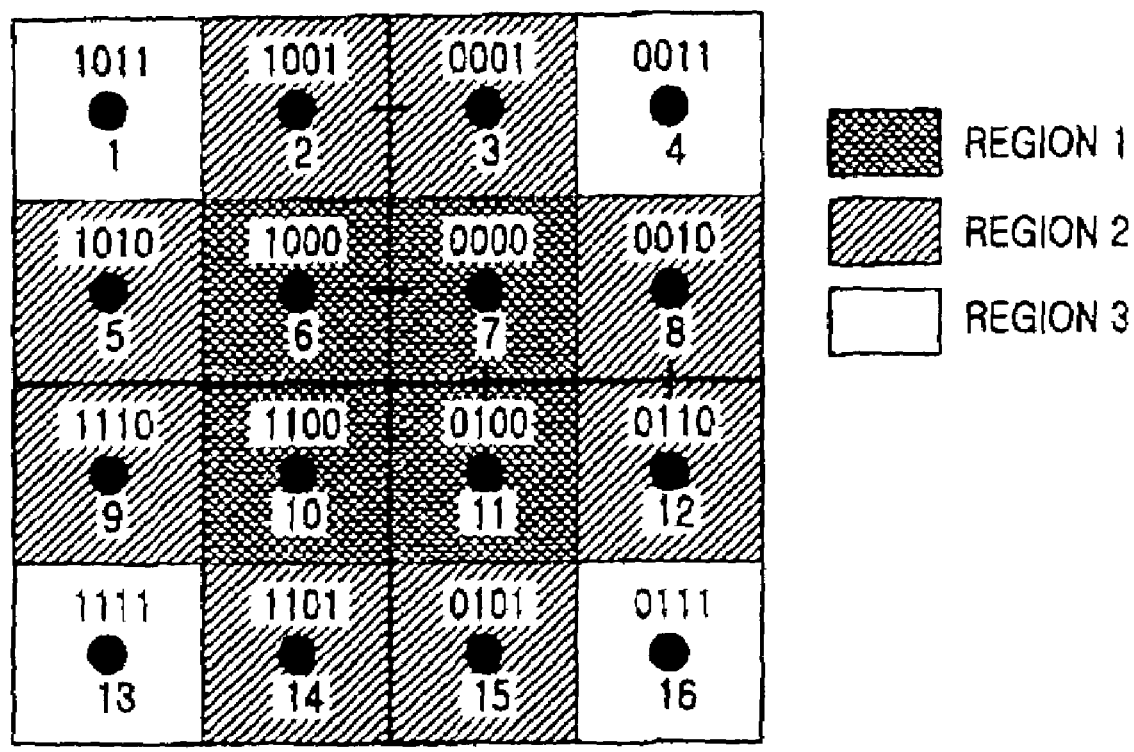
FIG. 2 illustrates an example of a signal constellation in 16-QAM in the CDMA mobile communication system.
Figure 3:
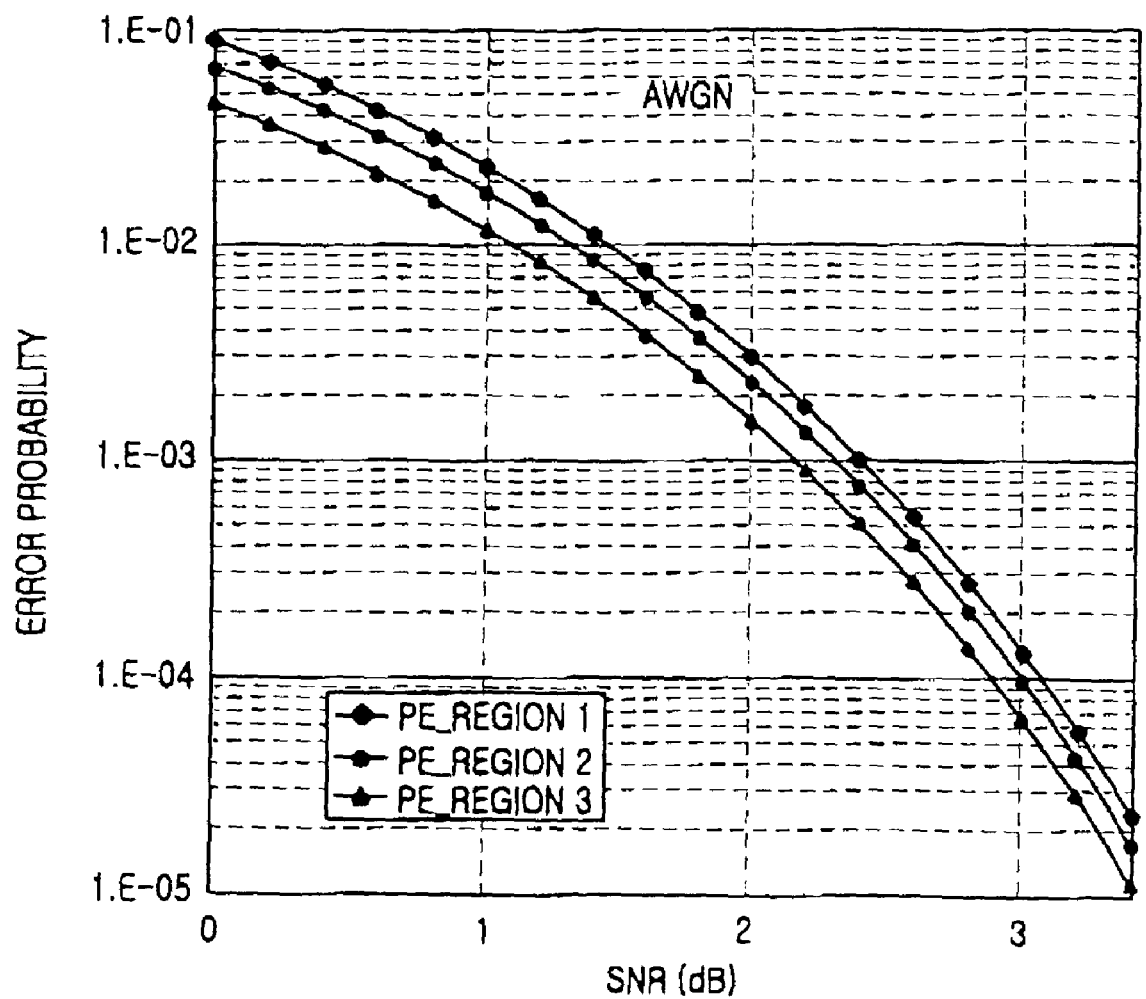
FIG. 3 illustrates error probabilities of regions in the signal constellation of 16-QAM.

In connection with the signal constellation of FIG. 2, the initial transmission modulation symbol [0000] in region 1 is retransmitted as [1111] in region 3. From the graphs of FIG. 3, it is noted that the error probability of region 1 is much higher than that of region 3. Continuous transmission of a specific symbol in a region with a high error probability adversely influences system performance. However, retransmission of a symbol in a different transmission region leads to averaging the error probabilities of bits and thus increases decoding performance according to the present invention. A modulation symbol transmitted in region 1 at an initial transmission is retransmitted in region 3, thereby ensuring improved system performance.

The above-described procedure is summarized below:

(1) a data packet is initially transmitted;

(2) bits of the packet are inverted and fed to a modulator upon receipt of a first NACK signal for the packet;

(3) the bits of the packet are fed to the modulator without bit inversion upon receipt of a second NACK signal for the packet;

(4) steps (1) & (2) and steps (1) & (3) are alternately performed upon receipt of a third and following NACK signals; and (5) a buffer is initialized and a new packet is transmitted upon receipt of an ACK signal in the above steps.

Now packet reception in the receiver will be described.

In operation, the demodulator 410 demodulates data received from the transmitter in a demodulation method corresponding to the modulation scheme used in the transmitter. The bit inverter 420 selectively inverts the demodulated bits under the control of the inversion controller 425. The bit inverter 420 is activated at each odd-numbered packet retransmission of the same packet, which will be described in more detail referring to FIG. 10. Bits illustrated in FIG. 10 correspond to those illustrated in FIG. 9.

Figure 10:
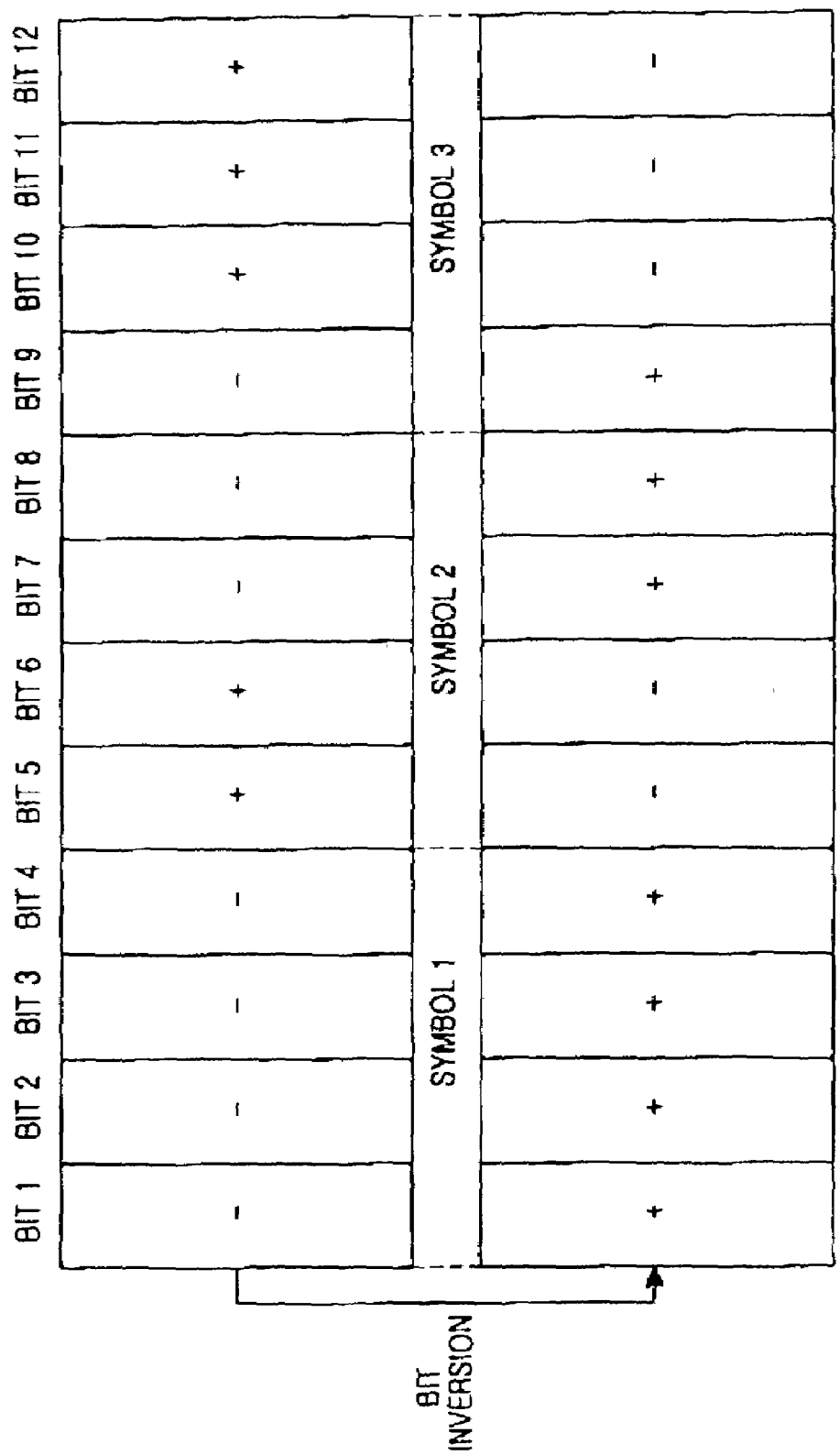
FIG. 10 illustrates bit inversion in the receiver according to the present invention.

Retransmitted bits as illustrated in the upper half of FIG. 10 in response to the first NACK signal are input to the bit inverter 420. Since the retransmission bits were inverted in the transmitter, they are inverted to the original bits illustrated in the lower half of FIG. 10 for combining at the receiver. Consequently, the recovered bits are identical to the original bits before bit inversion in the transmitter as illustrated in FIG. 9. That is, the bit inverter 420 in the receiver functions to invert the received bits each time an odd-numbered NACK signal is generated for the same packet.

The deinterleaver 430 deinterleaves the bits received from the demodulator 410 or the bit inverter 420 in the interleaving rule used in the interleaver 240 of the transmitter. The combiner 440 combines initial transmission bits stored in the buffer 450 with their retransmission bits. If a plurality of retransmissions have occurred, coded bits received at each retransmission are accumulated. As stated before, the coded bits of the same packet are combined.

For combining, the combiner 440 receives previously received coded bits from the buffer 450. The buffer 450 stores them according to an CRC check result in the CRC checker 470. For an initial transmission, the combiner 440 stores the coded bits in the buffer and feeds them to the channel decoder 460 contemporaneously.

The CRC checker 470 extracts CRC bits from decoded information bits on a packet basis and determines whether the packet has errors based on the CRC bits. If the packet has errors, the CRC checker 470 reports the errors to the upper layer and requests a retransmission of the packet by transmitting a NACK signal to the transmitter. If the packet is free of errors, the CRC checker 470 delivers the information bits to the upper layer and transmits an ACK signal to the transmitter. In this case, the buffer 450 is initialized.

Figure 11:
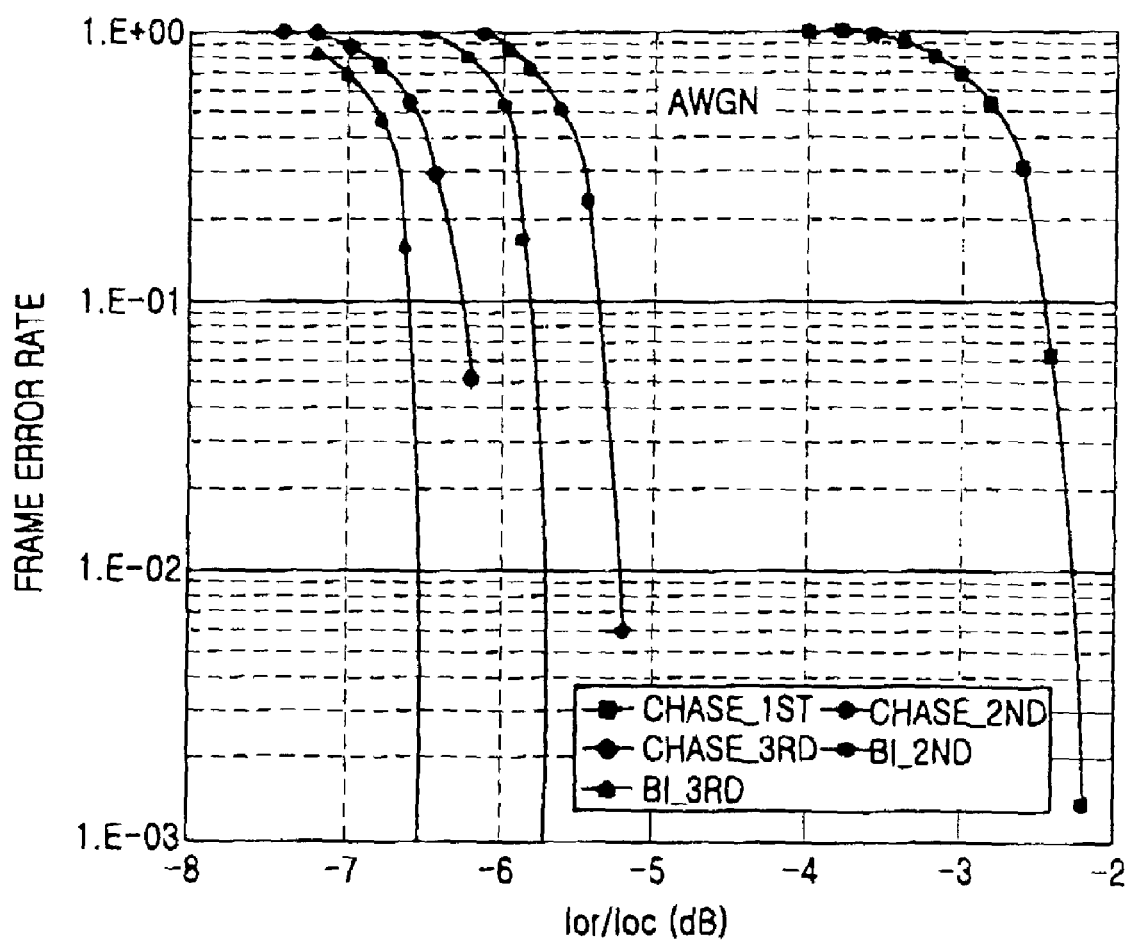
FIG. 11 illustrates a comparison between frame error rates at retransmissions according to the present invention and at a retransmission according to a conventional method under an AWGN environment.

FIG. 11 is a graph illustrating frame error rates at retransmissions according to the present invention and a conventional method under an AWGN environment. Referring to FIG. 11, Chase_$1^{st}$ denotes initial transmission, Chase_$2^{nd}$ denotes a $1^{st}$ retransmission in the conventional method, and Chase_$3^{rd}$ denotes a $2^{nd}$ retransmission in the conventional method. BI (Bit Inversion)_$2^{nd}$ and BI_$3^{rd}$ respectively denote $1^{st}$ and $2^{nd}$ retransmissions in the present invention. As noted from FIG. 11, an error probability is decreased by 0.4 to 0.6 dB at the $1^{st}$ and $2^{nd}$ retransmissions in the present invention.

In accordance with the present invention as described above, buffered bits are mapped at a retransmission to signal points in different regions from those at an initial transmission. Therefore, the error probabilities of initial transmission bits and retransmission bits are averaged in effect, thus ensuring improved decoding efficiency. Since the present invention can be implemented simply by adding a simple bit inverter at the frontal end of an interleaver and the rear end of a deinterleaver, excellent effects can be achieved without the need for altering the conventional transmitter and receiver on a large scale.

Furthermore, the present invention is applicable to any of existing transmitters and receivers in wired/wireless communication. If the present invention is implemented for high-speed wireless data packet service under discussion for the 3GPP standardization, the overall system performance can be remarkably increased without increasing system complexity. That is, the bit error rates (BERs) of existing systems are reduced and as a result, data throughput is improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of retransmitting coded bits, upon a retransmission request from a receiver, in a transmitter of a CDMA (Code Division Multiple Access) mobile communication system, which modulates bits encoded at a predetermined code rate in a predetermined modulation scheme and transmits the modulated bits to the receiver, the method comprising the steps of:
   inverting the coded bits to generate inverted bits upon the retransmission request from the receiver, the retransmission request being odd-numbered for the same data;
   modulating the inverted bits in the predetermined modulation scheme; and
   transmitting the modulated bits to the receiver.

2. The method of claim 1, wherein the inverted bits have a different error probability than in a previous transmission.

3. The method of claim 1, wherein the predetermined modulation scheme is one of 16QAM (Quadrature Amplitude Modulation) and 64QAM.

4. An apparatus for retransmitting coded bits, upon a retransmission request from a receiver, in a transmitter of a CDMA (Code Division Multiple Access) mobile communication system, which modulates bits encoded at a predetermined code rate in a predetermined modulation scheme and transmits the modulated bits to the receiver, the apparatus comprising:
   a bit inverter for inverting the coded bits to generate inverted bits upon the retransmission request from the receiver, the retransmission request being odd-numbered for the same data; and
   a modulator for modulating the inverted bits in the predetermined modulation scheme.

5. The apparatus of claim 4, wherein the inverted bits have a different error probability than in a previous transmission.

6. The apparatus of claim 4, wherein the predetermined modulation scheme is one of 16QAM (Quadrature Amplitude Modulation) and 64QAM.

7. An apparatus for retransmitting coded bits, upon a retransmission request from a receiver, in a transmitter of a CDMA (Code Division Multiple Access) mobile communication system, the apparatus comprising:
   a channel encoder for encoding input data at a predetermined code rate and outputting coded bits;
   an interleaver for interleaving the coded bits in a predetermined interleaving rule to generate inverted bits;
   a bit inverter for inverting at least a portion of the interleaved bits to generate inverted bits if the receiver requests an odd-numbered retransmission; and
   a modulator for modulating the inverted bits in a predetermined modulation scheme.

8. An apparatus for retransmitting coded bits, upon a retransmission request from a receiver, in a transmitter of a CDMA (Code Division Multiple Access) mobile communication system, the apparatus comprising:
   a channel encoder for encoding input data at a predetermined code rate and outputting coded bits;
   a bit inverter for inverting the coded bits to generate inverted bits, if the receiver requests an odd-numbered retransmission for the same data;
   an interleaver for interleaving the inverted bits in a predetermined interleaving rule; and
   a modulator for modulating the interleaved bits in a predetermined modulation scheme.

9. A method of receiving coded bits retransmitted from a transmitter after bit inversion and modulation of initially transmitted coded bits upon a retransmission request from a receiver in a CDMA (Code Division Multiple Access) mobile communication system, the method comprising the steps of:
   demodulating data received by the retransmission request according to a predetermined modulation scheme and outputting coded bits;
   inverting the coded bits to generate inverted bits, the retransmission request being odd-numbered for the same data; and
   decoding the inverted bits.

10. The method of claim 9, wherein the predetermined modulation scheme is one of 16QAM (Quadrature Amplitude Modulation) and 64QAM.

11. An apparatus for receiving coded bits retransmitted from a transmitter after bit inversion and modulation of initially transmitted coded bits upon a retransmission request from a receiver in a CDMA (Code Division Multiple Access) mobile communication system, the apparatus comprising:
   a demodulator for demodulating data received by the retransmission request according to a predetermined modulation scheme and outputting coded bits;
   a bit inverter for inverting the coded bits to generate inverted bits, the retransmission request being odd-numbered for the same data; and
   a channel decoder for decoding the inverted bits.

12. The apparatus of claim 11, further comprising:
   an error checker for extracting error check bits for decoded information bits on a packet basis and determining whether the decoded information bits have errors according to the extracted error check bits; and
   a controller for requesting another retransmission of the coded bits to the transmitter if the information bits have errors.

13. The apparatus of claim 11, wherein the predetermined modulation scheme is one of 16QAM (Quadrature Amplitude Modulation) and 64QAM.

14. An apparatus for receiving coded bits retransmitted from a transmitter after bit inversion and modulation of initially transmitted coded bits upon a request for retransmission from a receiver in of a CDMA (Code Division Multiple Access) mobile communication system, comprising:

a demodulator for demodulating data received by the retransmission request according to a predetermined modulation scheme and outputting coded bits;

a bit inverter for determining whether the coded bits have been received by an odd-numbered retransmission request for the same data, and inverting at least a portion of the coded bits to generate inverted bits if the data has been received by an odd-numbered retransmission request;

a deinterleaver for deinterleaving the inverted bits in a predetermined deinterleaving rule;

a combiner for combining the deinterleaved bits with previously coded bits;

a channel decoder for decoding the combined bits and outputting decoded information bits;

an error checker for extracting error check bits from the decoded information bits on a packet basis and determining whether the decoded information bits have errors according to the extracted error check bits; and a controller for requesting another retransmission of the coded bits to the transmitter if the information bits have errors.

15. An apparatus for receiving-coded bits retransmitted from a transmitter after bit inversion and modulation of initially transmitted coded bits upon a retransmission request from a receiver in a CDMA (Code Division Multiple Access) mobile communication system, comprising:

a demodulator for demodulating data received by the retransmission request according to a predetermined modulation scheme and outputting coded bits;

a deinterleaver for deinterleaving the demodulated bits in a predetermined deinterleaving rule;

a bit inverter for determining whether the coded bits have been received by an odd-numbered retransmission request for the same data, and inverting at least a portion of the coded bits to generate bits if the data has been received by an odd-numbered retransmission request;

a combiner for combining the inverted bits with previously coded bits;

a channel decoder for decoding the combined bits and outputting decoded information bits;

an error checker for extracting error check bits from the decoded information bits on a packet basis and determining whether the information bits have errors according to the extracted error check bits; and a controller for requesting another retransmission of the coded bits to the transmitter if the information bits have errors.

* * * * *